(12) United States Patent
Wang et al.

(10) Patent No.: US 11,813,502 B2
(45) Date of Patent: Nov. 14, 2023

(54) BALL PICKING ROBOT AND BALL UNLOADING METHOD USING THE SAME

(71) Applicant: Wuyi University, Jiangmen (CN)

(72) Inventors: Tianlei Wang, Jiangmen (CN); Jiongzhi Qiu, Jiangmen (CN); Simian Chen, Jiangmen (CN); Rong Fu, Jiangmen (CN); Jingling Zhang, Jiangmen (CN); Jiangyuan Chen, Jiangmen (CN); Yikui Zhai, Jiangmen (CN); Na Xiao, Jiangmen (CN); Junda Deng, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 745 days.

(21) Appl. No.: 16/976,957

(22) PCT Filed: May 22, 2020

(86) PCT No.: PCT/CN2020/091791
§ 371 (c)(1),
(2) Date: Aug. 31, 2020

(87) PCT Pub. No.: WO2020/233703
PCT Pub. Date: Nov. 26, 2020

(65) Prior Publication Data
US 2021/0138311 A1    May 13, 2021

(30) Foreign Application Priority Data
May 23, 2019  (CN) .......................... 201910434390.6

(51) Int. Cl.
*A63B 47/02*   (2006.01)
*A63B 47/00*   (2006.01)
(Continued)

(52) U.S. Cl.
CPC .......... *A63B 47/021* (2013.01); *A63B 47/002* (2013.01); *B60P 1/006* (2013.01);
(Continued)

(58) Field of Classification Search
CPC ........................ A63B 47/021; A63B 2047/022
See application file for complete search history.

(56) References Cited

U.S. PATENT DOCUMENTS 3,485,398 A * 12/1969 Offner .................. A63B 47/021
                                                    414/440
3,989,151 A * 11/1976 Dyer .................... A63B 47/021
                                                    56/328.1
(Continued)

FOREIGN PATENT DOCUMENTS

CN          108283796 A  *  7/2018  ........... A63B 47/021

OTHER PUBLICATIONS

CN 108283796 A (Chen) Jul. 17, 2018 (English language machine translation). [online] [retrieved Sep. 19, 2023]. Retrieved from: espacenet. (Year: 2018).*

*Primary Examiner* — Jonathan Snelting
(74) *Attorney, Agent, or Firm* — Vivacqua Crane, PLLC

(57) ABSTRACT

A ball picking robot and a ball unloading method using the same. The ball picking robot includes a chassis, an L-shaped hanging lug, a ball storage frame, an electric push rod disposed on the chassis, a baffle disposed on the chassis, a bracket disposed on the chassis and a drive motor for driving the electric push rod to move. A movable end of the electric push rod is connected with one end of the L-shaped hanging lug, the other end of the L-shaped hanging lug is connected with a side of the ball storage frame, and a camera is disposed on the bracket.

10 Claims, 6 Drawing Sheets

(51) Int. Cl.
*B60P 1/00* (2006.01)
*G05D 1/02* (2020.01)
*A63B 69/38* (2006.01)

(52) U.S. Cl.
CPC ............ *G05D 1/0255* (2013.01); *A63B 69/38* (2013.01); *A63B 2047/022* (2013.01)

(56) References Cited

U.S. PATENT DOCUMENTS

| | | | | |
|---|---|---|---|---|
| 4,077,533 | A * | 3/1978 | Meyer | A63B 47/021 414/440 |
| 4,735,544 | A * | 4/1988 | Stotts | A63B 47/021 414/440 |
| 6,079,930 | A * | 6/2000 | Valdes-Rodriguez | A63B 47/021 414/440 |
| 8,602,711 | B1 * | 12/2013 | Nash | A63B 47/021 414/440 |

* cited by examiner

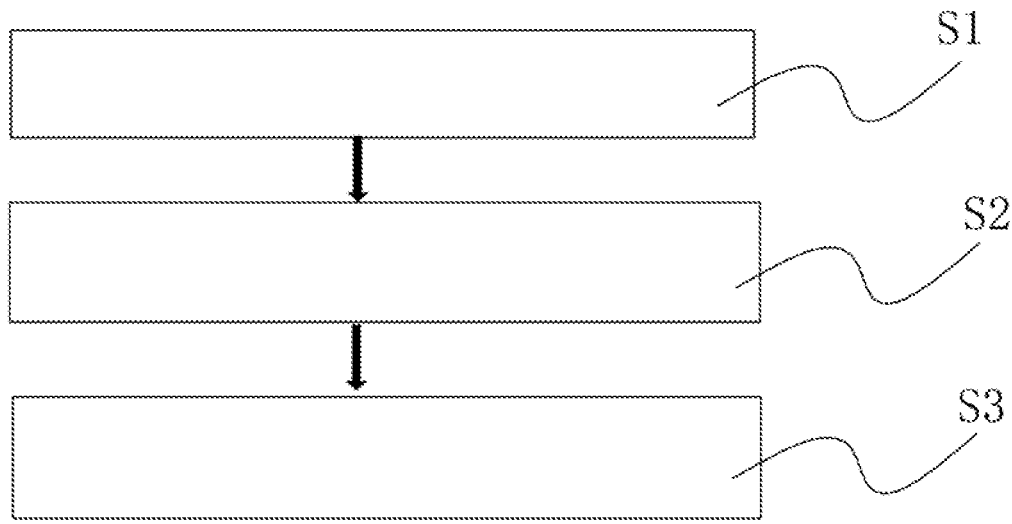

S1 moving the ball picking robot to a ball unloading point, and driving by the drive motor the movable end of the electric push rod to cause the ball storage frame to move upwardly S2 rising the ball storage frame to a highest point, and driving by the drive motor the electric push rod to alternately descend and rise so as to shake the ball storage frame S3 in response to detection by the camera that no tennis ball exists in the ball storage frame, driving by the drive motor the electric push rod to move downwardly to complete ball unloading

Fig.4

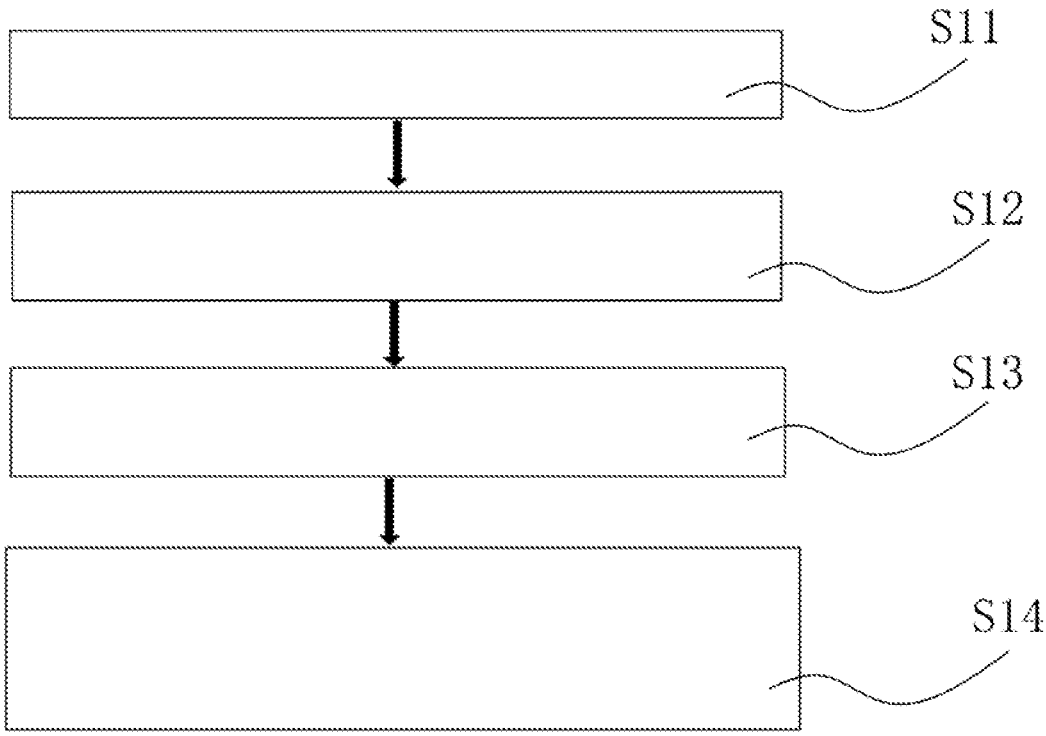

S11 moving the ball picking robot towards a tennis ball collection apparatus

S12 in response to a distance between the ball picking robot and the tennis ball collection apparatus reaching a preset value of a turning distance, rotating the ball picking robot by 180 degrees S13 sending by the ball picking robot an ultrasonic detection signal in a direction towards the tennis ball collection apparatus, and moving the ball picking robot backwardly S14 receiving by the ball picking robot an ultrasonic reflection signal reflected from the tennis ball collection apparatus and performing distance measurement, and in response to a measured distance value between the ball picking robot and the tennis ball collection apparatus reaching a preset value of a ball unloading distance, stop moving the ball picking robot

Fig.5

BALL PICKING ROBOT AND BALL UNLOADING METHOD USING THE SAME

CROSS-REFERENCE TO RELATED APPLICATION

This application is a national stage application under 35 U.S.C. 371 of PCT Application No. PCT/CN2020/091791, filed on 22 May 2020, which PCT application claimed the benefit of Chinese Patent Application No. 2019104343906, filed on 23 May 2019, the entire disclosure of each of which are hereby incorporated herein by reference.

TECHNICAL FIELD

The disclosure relates to a sport auxiliary system, and more particularly, to the auxiliary field of tennis.

BACKGROUND

With the rapid development of economy, people's cultural life is becoming richer and richer, and tennis has also been well promoted and developed. A ball picking robot has been developed currently to pick up balls scattered on a court to improve a tennis training efficiency, and the ball picking robot may also unload the tennis balls picked up. The ball picking robot usually uses a roller to pick up the tennis balls on the ground when picking up the balls, and then guides the tennis balls to a ball storage frame through an inclined plate. However, if the roller rotates too fast and there are too many tennis balls in the ball storage frame, the tennis balls may possibly fly out of the ball storage frame. In addition, the ball picking robot usually uses a gravity of the tennis balls during ball unloading, but the tennis balls may not be able to roll down naturally by simply using the gravity of the tennis balls in the case that a friction force is increased due to mutual extrusion of too many tennis balls in the ball storage frame of the ball picking robot, so that the balls cannot be unloaded.

SUMMARY

The disclosure is intended to solve at least one of the technical problems in the prior art, and provides a ball picking robot and a ball unloading method using the same, which may solve a problem that balls are unable to be unloaded due to too many tennis balls existing in a ball storage frame; and may also prevent the balls from flying out due to an excessively rapid rising speed of the tennis balls when the ball picking robot picks up the balls.

The technical solutions adopted in the disclosure to solve the problem are as follows.

According to a first aspect of the disclosure there is provided a ball picking robot, which includes a chassis, an L-shaped hanging lug, a ball storage frame, an arc ball delivery plate, an electric push rod disposed on the chassis, and a bracket and a drive motor disposed on the chassis, wherein a movable end of the electric push rod is connected with one end of the L-shaped hanging lug, the other end of the L-shaped hanging lug is connected with a side of the ball storage frame, a camera for photographing an interior of the ball storage frame is disposed on the bracket, and the drive motor is able to drive the electric push rod to move up and down to shake the ball storage frame; the arc ball delivery plate is disposed on the chassis and opposite to a ball inlet of the ball storage frame, the ball storage frame is further provided with a ball outlet opposite to the ball inlet, the chassis is further provided with a baffle capable of blocking the ball outlet, the arc ball delivery plate includes a guide portion, a convex portion and a concave portion, which are connected in sequence, and a curvature of the convex portion is larger than a curvature of the guide portion and a curvature of the concave portion; and the chassis is provided with a first support column and a second support column, the first support column is axially connected with a first roller for guiding a tennis ball on the ground to reach the arc ball delivery plate, and the second support column is axially connected with a second roller for guiding a tennis ball on the arc ball delivery plate to be transferred to the ball storage frame.

Further, a ball guide limiting plate is disposed at a front corner of the ball storage frame, and the ball guide limiting plate abuts against a side edge of the arc ball delivery plate.

Further, the chassis is provided with a clamping groove matched with a lower end of the ball guide limiting plate.

Further, the ball storage frame includes a bottom plate, a front baffle connected with the bottom plate and a turning plate hinged with the bottom plate, a height of the bottom plate at one end hinged with the turning plate is lower than a height of the bottom plate at the other end connected with the front baffle, the baffle is able to limit the turning plate, and a center of gravity of the turning plate deviates from a connecting edge between the turning plate and the bottom plate towards the baffle.

Further, two ball guide plates which cooperate to expand outwardly are disposed below the chassis.

Further, four Mecanum wheels are installed below the chassis.

According to a first aspect of the disclosure there is provided a ball unloading method applied to the ball picking robot according to the first aspect of the disclosure, which includes the following steps:

moving the ball picking robot to a ball unloading point, and driving by the drive motor the movable end of the electric push rod to cause the ball storage frame to move upwardly;

rising the ball storage frame to a highest point, and driving by the drive motor the electric push rod to alternately descend and rise so as to shake the ball storage frame; and in response to detection by the camera that no tennis ball exists in the ball storage frame, driving by the drive motor the electric push rod to move downwardly to complete ball unloading.

Further, the moving the ball picking robot to a ball unloading point includes the following steps:

moving the ball picking robot towards a tennis ball collection apparatus;

in response to a distance between the ball picking robot and the tennis ball collection apparatus reaching a preset value of a turning distance, rotating the ball picking robot by 180 degrees;

sending by the ball picking robot an ultrasonic detection signal in a direction towards the tennis ball collection apparatus, and moving the ball picking robot backwardly;

receiving by the ball picking robot an ultrasonic reflection signal reflected from the tennis ball collection apparatus and performing distance measurement, and in response to a measured distance value between the ball picking robot and the tennis ball collection apparatus reaching a preset value of a ball unloading distance, stop moving the ball picking robot.

Further, after driving by the drive motor the movable end of the electric push rod to cause the ball storage frame to move upwardly, the method further includes:

opening the turning plate in response to a height of the turning plate of the ball storage frame is higher than a height of the baffle on the ball picking robot.

Further, a length of the opened turning plate projected on a horizontal plane is equal to the preset value of the ball unloading distance.

At least one embodiment of the disclosure has the following beneficial effects. When the ball picking robot is picking up the ball, the first roller and the second roller are driven by a roller motor to rotate; when the tennis ball is under the chassis, driven by rotation of the first roller, the tennis ball can move upwardly along the arc ball delivery plate, the guide portion is able to make the tennis ball lift from the ground in a direction towards the ball storage frame, the convex portion makes the tennis ball decelerate during lifting, so that the tennis ball would not fly away due to an excessively rapid lifting speed, and the tennis ball is able to be smoothly and slowly pushed into the ball storage frame due to the fact that the curvature of the concave portion is smaller than the curvature of the convex portion, thus significantly preventing the tennis ball from flying away. When the ball picking robot reaches the ball unloading point, the drive motor drives the movable end of the electric push rod to move upwardly, and since the movable end of the electric push rod is connected with the L-shaped hanging lug, and the other end of the L-shaped hanging lug is connected with the ball storage frame, the ball storage frame is able to move upwardly following the movable end of the electric push rod; when the height of the ball outlet of the ball storage frame is higher than the height of the baffle, the baffle is unable to block the ball outlet, and the tennis ball in the ball storage frame can roll out of the ball outlet and reach the tennis ball collection apparatus; when the ball storage frame rises to the highest point, the drive motor controls the electric push rod to alternately descend and rise so as to shake the ball storage frame, and the tennis ball in the ball storage frame is shaken into the tennis ball collection apparatus, which significantly prevents a situation that the tennis balls are difficult to roll down due to mutual extrusion of too many tennis balls, so that the ball picking robot is able to be quicker, more convenient and more effective during ball unloading; and when the camera on the ball picking robot detects that the tennis balls in the ball storage frame are completely unloaded, the drive motor will drive the electric push rod to move downwardly, thus completing the ball unloading, so that the ball unloading is more intelligent.

BRIEF DESCRIPTION OF THE DRAWINGS

The disclosure is further described hereinafter with reference to the accompanying drawings and the embodiments.

FIG. 4 is a flow chart of a ball unloading method using a ball picking robot provided in Embodiment 2 of the disclosure;

FIG. 5 is a flow chart of making the ball picking robot reach a ball unloading point in the ball unloading method using a ball picking robot provided in Embodiment 2 of the disclosure.

DETAILED DESCRIPTION OF THE EMBODIMENTS

To make the objectives, the technical solutions, and the advantages of the disclosure clearer, the disclosure is further described in detail hereinafter with reference to the accompanying drawings and the embodiments. It should be understood that the specific embodiments described herein are only used for explaining the disclosure and are not intended to limit the disclosure.

It should be noted that, the various features in the embodiments of the disclosure may be combined with each other if there is no conflict, and all combinations are included in the protection scope of the disclosure. In addition, although functional modules are divided in the apparatus diagram and logical sequence is shown in the flow chart, the steps shown or described may be performed according to different module division in the apparatus or different sequence in the flow chart in some cases.

With the rapid development of economy, people's cultural life is becoming richer and richer, and tennis has also been well promoted and developed. A ball picking robot has been developed currently to pick up balls scattered on a court to improve a tennis training efficiency, and the ball picking robot may also unload the tennis balls picked up. The ball picking robot usually uses a roller to pick up the tennis balls on the ground when picking up the balls, and then guides the tennis balls to a ball storage frame through an inclined plate. However, if the roller rotates too fast and there are too many tennis balls in the ball storage frame, the tennis balls may possibly fly out of the ball storage frame. In addition, the ball picking robot usually uses a gravity of the tennis balls during ball unloading, but the tennis balls may not be able to roll down naturally by simply using the gravity of the tennis balls in the case that a friction force is increased due to mutual extrusion of too many tennis balls in the ball storage frame of the ball picking robot, so that the balls cannot be unloaded.

On this basis, the disclosure provides a ball picking robot and a ball unloading method using the same, which may solve a problem that balls are unable to be unloaded due to too many tennis balls existing in a ball storage frame, and may also prevent the balls from flying out due to an excessively rapid rising speed of the tennis balls when the ball picking robot picks up the balls.

The embodiments of the disclosure are further described hereinafter with reference to the accompanying drawings.

Embodiment 1

Figure 1:
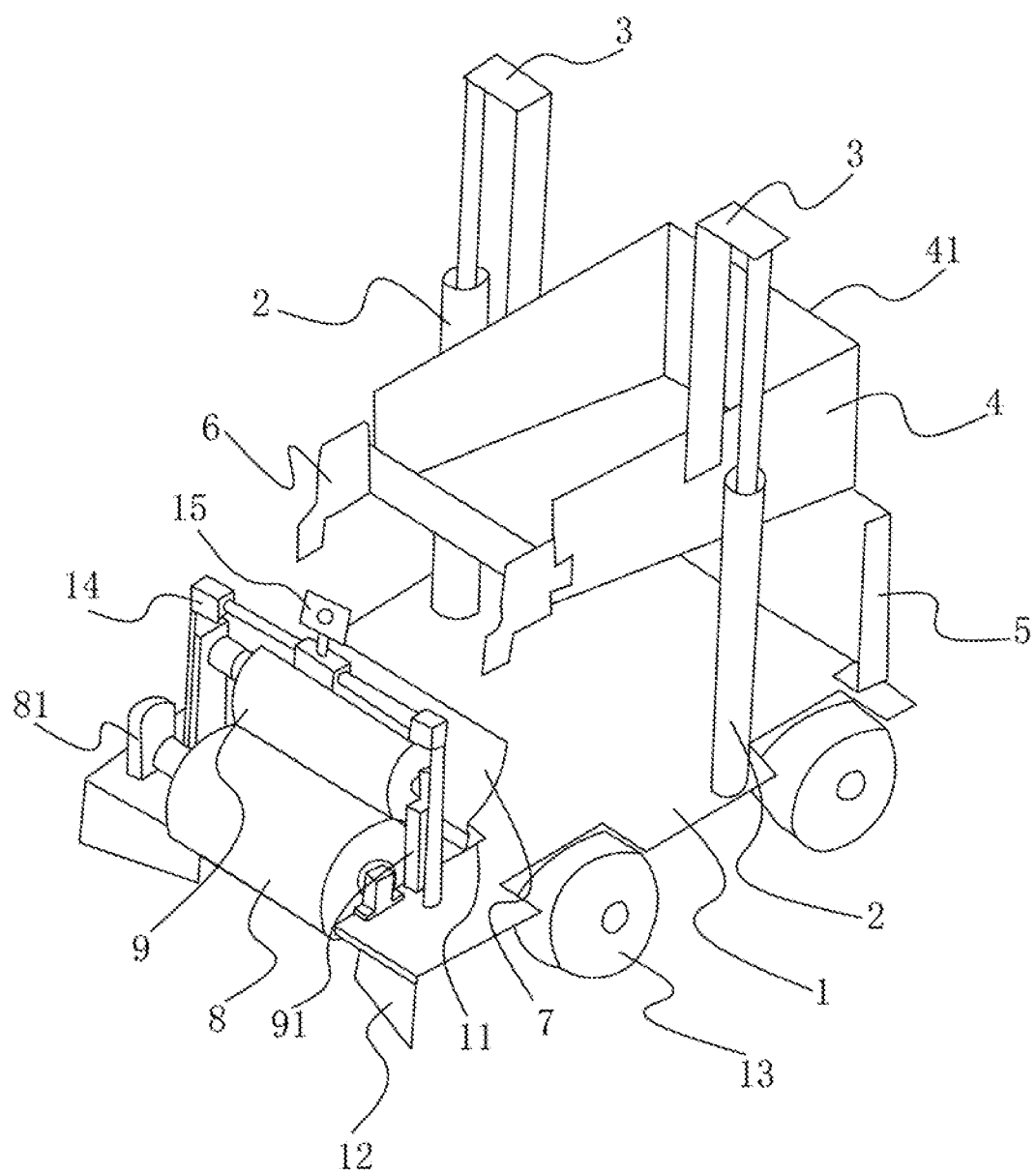
FIG. 1 is a structure diagram of a ball picking robot provided in Embodiment 1 of the disclosure.
Figure 2:
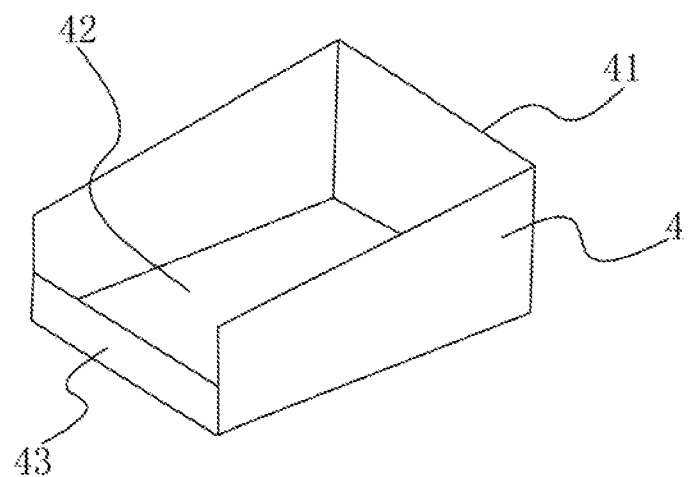
FIG. 2 is a simplified diagram of a ball storage frame of the ball picking robot provided in Embodiment 1 of the disclosure.
Figure 3:
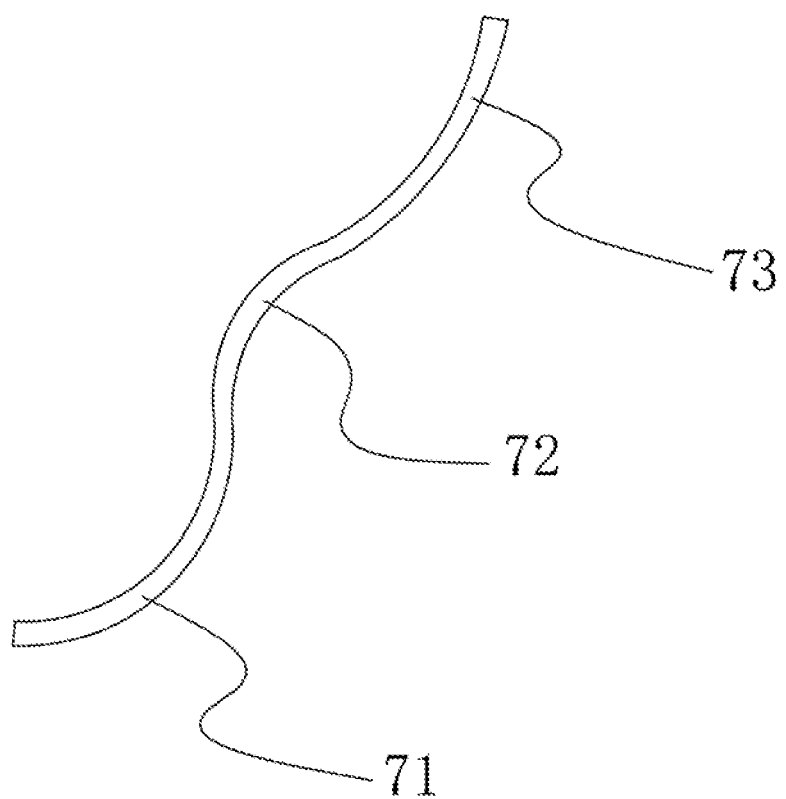
FIG. 3 is a simplified diagram of an arc ball delivery plate of the ball picking robot provided in Embodiment 1 of the disclosure.

With reference to FIG. 1 to FIG. 3, Embodiment 1 of the disclosure provides a ball picking robot, which includes a chassis 1, an L-shaped hanging lug 3, a ball storage frame 4, an arc ball delivery plate 7, an electric push rod 2 disposed on the chassis 1, and a bracket 14 and a drive motor disposed on the chassis 1. A movable end of the electric push rod 2 is connected with one end of the L-shaped hanging lug 3, the other end of the L-shaped hanging lug 3 is connected with a side of the ball storage frame 4, a camera 15 for photographing an interior of the ball storage frame 4 is disposed on the bracket 14, and the drive motor is able to drive the electric push rod 2 to move up and down to shake the ball storage frame 4. The arc ball delivery plate 7 is disposed on the chassis 1 and opposite to a ball inlet of the ball storage frame 4, the ball storage frame 4 is further provided with a ball outlet opposite to the ball inlet, and the chassis 1 is further provided with a baffle 5 capable of blocking the ball outlet. The arc ball delivery plate 7 includes a guide portion 71, a convex portion 72 and a concave portion 73, the guide portion 71, the convex portion 72 and the concave portion 73 are connected in sequence, and a curvature of the convex portion 72 is larger than a curvature of the guide portion 71 and a curvature of the concave portion 73. The chassis 1 is provided with a first support column 81 and a second support column 91, the first support column 81 is axially connected with a first roller 8 for guiding a tennis ball on the ground to reach the arc ball delivery plate 7, and the second support column 91 is axially connected with a second roller 9 for guiding a tennis ball on the arc ball delivery plate to be transferred to the ball storage frame 4. When the ball picking robot is picking up a ball, the first roller 8 and the second roller 9 are driven by a respective roller motor to rotate. When the tennis ball is under the chassis, driven by rotation of the first roller 8, the tennis ball can move upwardly along the arc ball delivery plate 7. The guide portion 71 is able to make the tennis ball lift from the ground in a direction towards the ball storage frame 4, the convex portion 72 makes the tennis ball decelerate during lifting, so that the tennis ball would not fly away due to an excessively rapid lifting speed, and the tennis ball is able to be smoothly and slowly pushed into the ball storage frame 4 due to the fact that the curvature of the concave portion 73 is smaller than the curvature of the convex portion 72, thus significantly preventing the tennis ball from flying away. When the ball picking robot reaches the ball unloading point, the drive motor drives the movable end of the electric push rod 2 to move upwardly, and since the movable end of the electric push rod 2 is connected with the L-shaped hanging lug 3, and the other end of the L-shaped hanging lug 3 is connected with the ball storage frame 4, the ball storage frame 4 is able to move upwardly following the movable end of the electric push rod 2. When the height of the ball outlet of the ball storage frame 4 is higher than the height of the baffle 5, the baffle 5 is unable to block the ball outlet, and the tennis ball in the ball storage frame 4 can roll out from the ball outlet and reach the tennis ball collection apparatus. When the ball storage frame 4 rises to the highest point, the drive motor controls the electric push rod 2 to alternately descend and rise so as to shake the ball storage frame 4, and the tennis ball in the ball storage frame is shaken into the tennis ball collection apparatus, which significantly prevents a situation that the tennis balls are difficult to roll down due to mutual extrusion of too many tennis balls, so that the ball picking robot is able to be quicker, more convenient and more effective during ball unloading. When the camera 15 on the ball picking robot detects that the tennis balls in the ball storage frame 4 are completely unloaded, the drive motor will drive the electric push rod 2 to move downwardly, thus completing the ball unloading, so that the ball unloading is more intelligent.

Further, a ball guide limiting plate 6 is disposed at a front corner of the ball storage frame 4, and the ball guide limiting plate 6 may abut against a side edge of the arc ball delivery plate 7. The ball guide limiting plate 6 is able to prevent a tennis ball from flying away when the tennis ball moves along the arc ball delivery plate 7, so that the tennis balls can all enter the ball storage frame 4.

Further, the chassis 1 is provided with a clamping groove 11 matched with a lower end of the ball guide limiting plate 6. The clamping groove 11 is able to limit and fix the ball guide limiting plate 6, so that the ball storage frame 4 will not deviate, and then the ball storage frame 4 can receive the tennis ball more stably.

The ball storage frame 4 includes a bottom plate 42, a front baffle 43 connected with the bottom plate 42 and a turning plate 41 hinged with the bottom plate 42. A height of the bottom plate 42 at one end hinged with the turning plate 41 is lower than a height of the bottom plate 42 at the other end connected with the front baffle 43, the baffle 5 is able to limit the turning plate 41, and a center of gravity of the turning plate 41 deviates from a connecting edge between the turning plate 41 and the bottom plate 42 towards the baffle 5. The front baffle 43 can prevent the tennis ball entering the ball storage frame 4 from rolling down from the front of the ball storage frame 4. The bottom plate 42 inclines at a certain angle with the ground and inclines towards the back of the ball storage frame 4, and the tennis ball in the ball storage frame 4 will roll towards the ball outlet of the ball storage frame 4 under an action of gravity. When the turning plate 41 rises to a height higher than the height of the baffle 5, the turning plate 41 can be opened by turning towards the baffle 5 under the action of gravity, and then the tennis ball in the ball storage frame 4 is able to roll down towards the ball outlet through the turning plate 41.

Further, two ball guide plates 12 which cooperate to expand outwardly are disposed below the chassis 1. The ball guide plates 12 each include an outer long side and an inner long side, a distance between two inner long sides is equal to a length of the first roller 8, and a ball delivery channel is formed between the two ball guide plates 12. The ball guide plates 12 are used for guiding the tennis ball on the ground, so that the tennis ball is able to enter an area where the first roller 8 is located, and then the tennis ball is able to be picked up into the ball storage frame 4.

Further, four Mecanum wheels 13 are installed below the chassis 1. The Mecanum wheels 13 are characterized by quick and convenient turning, so that the ball picking robot moves more flexibly.

It can be seen from the above technical solution that Embodiment 1 has the beneficial effects as follows. When the ball picking robot is picking up a ball, the first roller 8 and the second roller 9 are driven by the roller motor to rotate. When the tennis ball is under the chassis, driven by rotation of the first roller 8, the tennis ball can move upwardly along the arc ball delivery plate 7. The guide portion 71 is able to make the tennis ball lift from the ground in a direction towards the ball storage frame 4, the convex portion 72 makes the tennis ball decelerate during lifting, so that the tennis ball would not fly away due to an excessively rapid lifting speed, and the tennis ball is able to be smoothly and slowly pushed into the ball storage frame 4 due to the fact that the curvature of the concave portion 73 is smaller than the curvature of the convex portion 72, thus significantly preventing the tennis ball from flying away. When the ball picking robot reaches the ball unloading point, the drive motor drives the movable end of the electric push rod 2 to move upwardly, and since the movable end of the electric push rod 2 is connected with the L-shaped hanging lug 3, and the other end of the L-shaped hanging lug 3 is connected with the ball storage frame 4, the ball storage frame 4 is able to move upwardly following the movable end of the electric push rod 2. When the height of the ball outlet of the ball storage frame 4 is higher than the height of the baffle 5, the baffle 5 is unable to block the ball outlet, and the tennis ball in the ball storage frame 4 can roll out from the ball outlet and reach the tennis ball collection apparatus. When the ball storage frame 4 rises to the highest point, the drive motor controls the electric push rod 2 to alternately descend and rise so as to shake the ball storage frame 4, and the tennis ball in the ball storage frame 4 is shaken into the tennis ball collection apparatus, which significantly prevents a situation that the tennis balls are difficult to roll down due to mutual extrusion of too many tennis balls, so that the ball picking robot is able to be quicker, more convenient and more effective during ball unloading. When the camera 15 on the ball picking robot detects that the tennis balls in the ball storage frame 4 are completely unloaded, the drive motor will drive the electric push rod 2 to move downwardly, thus completing the ball unloading, so that the ball unloading is more intelligent.

Embodiment 2

With reference to FIG. 4 and FIG. 5, Embodiment 2 of the disclosure provides a ball unloading method using a ball picking robot, which includes the following steps.

At step S1, moving the ball picking robot to a ball unloading point, and driving by the drive motor the movable end of the electric push rod to cause the ball storage frame to move upwardly.

In this embodiment, after the ball picking robot reaches the ball unloading point, the drive motor will drive the movable end of the electric push rod to move upwardly. Since the movable end of the electric push rod is connected with the ball storage frame, the ball storage frame can also move upwardly following the movable end of the electric push rod.

At step S2, rising the ball storage frame to a highest point, and driving by the drive motor the electric push rod to alternately descend and rise so as to shake the ball storage frame.

In this embodiment, the ball storage frame moves upwardly under an action of the electric push rod, and when the ball storage frame reaches the highest point, the drive motor will drive the electric push rod to alternately descend and rise. Since a time interval between descending and rapid rising is very short, which may be 200 ms or 150 ms in each cycle, the ball storage frame will be shaken, and then the tennis ball in the ball storage frame will quickly and effectively roll down from the ball storage frame, thus preventing a situation that the tennis balls are unable to be unloaded by simply using a gravity in the case that a friction force is increased due to mutual extrusion of too many tennis balls in the ball storage frame.

At step S3, in response to detection by the camera that no tennis ball exists in the ball storage frame, driving by the drive motor the electric push rod to move downwardly to complete ball unloading.

In this embodiment, the camera photographs the ball storage frame. When the camera detects by photographing that no tennis ball exists in the ball storage frame, a ball unloading completion command will be sent to a main control chip of the ball picking robot. After receiving the ball unloading completion command, the main control chip will drive the electric push rod to move downwardly, thus completing the ball unloading.

Further, the moving the ball picking robot to a ball unloading point specifically includes the following steps.

At step S11, moving the ball picking robot towards a tennis ball collection apparatus.

In this embodiment, the ball picking robot moves to the tennis ball collection apparatus to prepare for the ball unloading, wherein the tennis ball collection apparatus may be a tennis ball collection frame.

At step S12, in response to a distance between the ball picking robot and the tennis ball collection apparatus reaching a preset value of a turning distance, rotating the ball picking robot by 180 degrees.

In this embodiment, when the distance between the ball picking robot and the tennis ball collection apparatus reaches the preset value of the turning distance, the ball picking robot rotates by 180 degrees, so that the ball storage frame is able to face the tennis ball collection apparatus to facilitate ball unloading.

At step S13, sending by the ball picking robot an ultrasonic detection signal in a direction towards the tennis ball collection apparatus, and moving the ball picking robot backwardly.

In this embodiment, the ball picking robot is provided with an ultrasonic module. In this step, when the ball picking robot needs to unload the ball to the tennis ball collection apparatus, the main control chip of the ball picking robot activates the ultrasonic module to measure whether the distance between the ball picking robot and the tennis ball collection apparatus meets a required distance for the ball unloading, wherein the main control chip in this embodiment is an ARM9 main control chip.

At step S14, receiving, by the ball picking robot, an ultrasonic reflection signal reflected from the tennis ball collection apparatus and performing distance measurement; and in response to a measured distance value between the ball picking robot and the tennis ball collection apparatus reaching a preset value of a ball unloading distance, stop moving the ball picking robot.

In this embodiment, when the ultrasonic module on the ball picking robot receives the ultrasonic signal reflected from the tennis ball collection apparatus, the distance between the ball picking robot and the tennis ball collection apparatus can be obtained by multiplying a speed of an ultrasonic wave by a time it takes to receive the reflected ultrasonic wave started from sending the ultrasonic signal, and then dividing the product by two. When the ultrasonic module detects that the distance between the ball picking robot and the tennis ball collection apparatus reaches the preset value of the ball unloading distance, the main control chip of the ball picking robot will control the ball picking robot to stop moving.

Further, after driving by the drive motor the movable end of the electric push rod to cause the ball storage frame to move upwardly, the method further including opening the turning plate in response to a height of the turning plate of the ball storage frame is higher than a height of the baffle on the ball picking robot. In this embodiment, when the ball storage frame rises to a certain height, the turning plate will be opened without limiting by the baffle, so that the tennis ball in the ball storage frame is able to roll down from the turning plate to the tennis ball collection apparatus.

Figure 6:
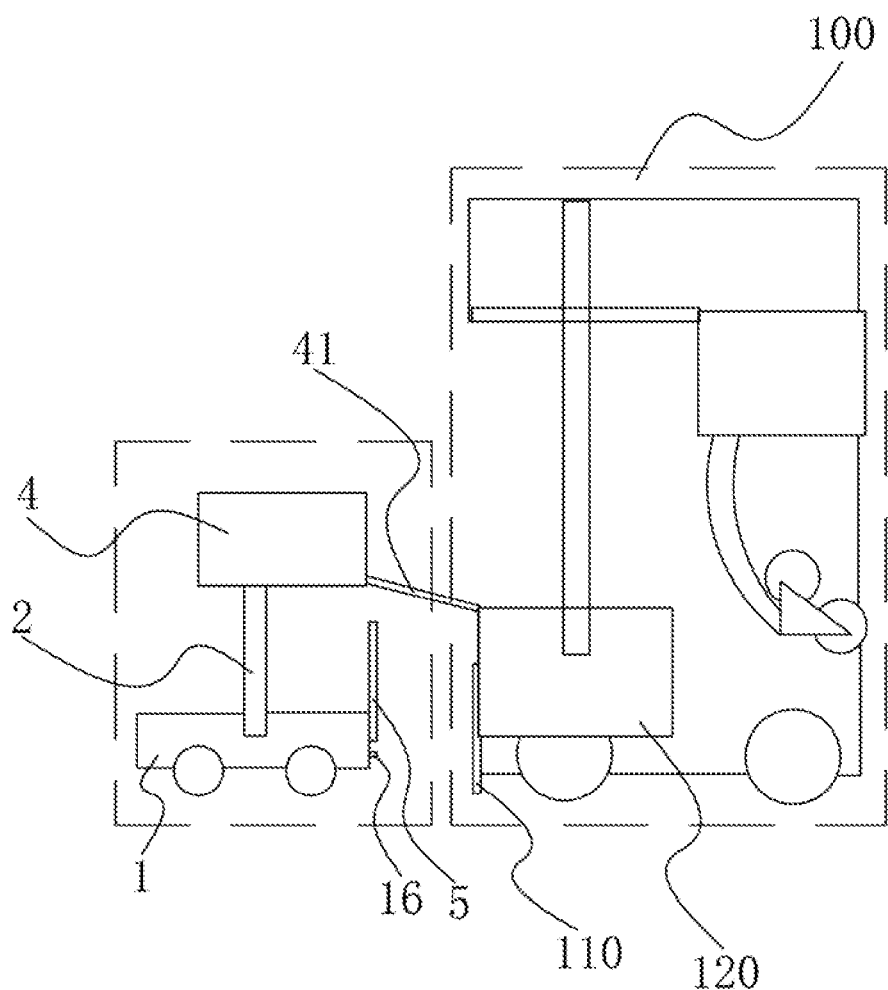
FIG. 6 is a diagram showing ball unloading by the ball picking robot provided in Embodiment 2 of the disclosure.

With reference to FIG. 6, a length of the opened turning plate 41 projected on a horizontal plane is equal to the preset value of the ball unloading distance. When the turning plate 41 is opened, the length of the turning plate projected on the horizontal plane is the distance between the ball picking robot and the tennis ball collection apparatus 100. When the distance between the ball picking robot and the tennis ball collection apparatus 100 is equal to the preset value of the ball unloading distance, the tennis ball in the ball storage frame 4 is able to smoothly reach the tennis ball collection apparatus 100 during the ball unloading of the ball picking robot, thus better completing the ball unloading. The tennis ball collection apparatus 100 may be provided with a tennis ball collection frame 120 for collecting the tennis ball and a reflection plate 110, and the ball picking robot may be provided with the ultrasonic module 16 for emitting the ultrasonic wave. When the ball picking robot moves to the tennis ball collection apparatus, the ultrasonic module 16 emits the ultrasonic wave, and the reflection plate 110 on the tennis ball collection apparatus 100 may reflect the ultrasonic wave, and then the ultrasonic module 16 may measure the distance between the ball picking robot and the tennis ball collection apparatus 100 according to the reflected ultrasonic wave.

It can be seen from the above technical solution that the embodiment 2 has the beneficial effects as follows. After the ball picking robot reaches the ball unloading point, the drive motor drives the electric push rod to move upwardly, and the ball storage frame moves upwardly following the electric push rod. When the ball storage frame rises to the highest point, the drive motor controls the electric push rod to alternately descend and rise so as to shake the ball storage frame, and the tennis ball in the ball storage frame is shaken into the tennis ball is a situation that the tennis balls are difficult to roll down due to mutual extrusion of too many tennis balls, so that the ball picking robot is able to be quicker, more convenient and more effective during the ball unloading. When the camera on the ball picking robot detects that the tennis balls in the ball storage frame are completely unloaded, the drive motor will drive the electric push rod to move downwardly, thus completing the ball unloading, so that the ball unloading is more intelligent.

The foregoing describes the preferred embodiments of the disclosure in detail, but the disclosure is not limited to the above embodiments. Those skilled in the art may further make various equivalent modifications or substitutions without departing from the principle of the disclosure, and these equivalent modifications or substitutions are all included in the scope defined by the claims of the present application.

We claim:

1. A ball picking robot, comprising a chassis, an L-shaped hanging lug, a ball storage frame, an arc ball delivery plate, an electric push rod disposed on the chassis, and a bracket and a drive motor disposed on the chassis, wherein a movable end of the electric push rod is connected with one end of the L-shaped hanging lug, another end of the L-shaped hanging lug is connected with a side of the ball storage frame, a camera for photographing an interior of the ball storage frame is disposed on the bracket, and the drive motor is able to drive the electric push rod to move up and down to shake the ball storage frame;
the arc ball delivery plate is disposed on the chassis and opposite to a ball inlet of the ball storage frame, the ball storage frame is further provided with a ball outlet opposite to the ball inlet, the chassis is further provided with a baffle capable of blocking the ball outlet, the arc ball delivery plate comprises a guide portion, a convex portion and a concave portion which are connected in sequence, and a curvature of the convex portion is larger than a curvature of the guide portion and a curvature of the concave portion; and
the chassis is provided with a first support column and a second support column, the first support column is axially connected with a first roller for guiding a tennis ball on the ground to reach the arc ball delivery plate, and the second support column is axially connected with a second roller for guiding a tennis ball on the arc ball delivery plate to be transferred to the ball storage frame.

2. The ball picking robot of claim 1, wherein a ball guide limiting plate is disposed at a front corner of the ball storage frame, and the ball guide limiting plate abuts against a side edge of the arc ball delivery plate.

3. The ball picking robot of claim 2, wherein the chassis is provided with a clamping groove matched with a lower end of the ball guide limiting plate.

4. The ball picking robot of claim 1, wherein the ball storage frame comprises a bottom plate, a front baffle connected with the bottom plate and a turning plate hinged with the bottom plate, a height of the bottom plate at one end hinged with the turning plate is lower than a height of the bottom plate at another end connected with the front baffle, the baffle is able to limit the turning plate, and a center of gravity of the turning plate deviates from a connecting edge between the turning plate and the bottom plate towards the baffle.

5. The ball picking robot of claim 1, wherein two ball guide plates which cooperate to expand outwardly are disposed below the chassis.

6. The ball picking robot of claim 1, wherein four Mecanum wheels are installed below the chassis.

7. A ball unloading method applied to the ball picking robot of claim 1, comprising the following steps:
moving the ball picking robot to a ball unloading point, and driving by the drive motor the movable end of the electric push rod to cause the ball storage frame to move upwardly;
rising the ball storage frame to a highest point, and driving by the drive motor the electric push rod to alternately descend and rise so as to shake the ball storage frame; and
in response to detection by the camera that no tennis ball exists in the ball storage frame, driving by the drive motor the electric push rod to move downwardly to complete ball unloading.

8. The ball unloading method of claim 7, wherein the moving the ball picking robot to a ball unloading point comprises the following steps:
moving the ball picking robot towards a tennis ball collection apparatus;
in response to a distance between the ball picking robot and the tennis ball collection apparatus reaching a preset value of a turning distance, rotating the ball picking robot by 180 degrees;
sending by the ball picking robot an ultrasonic detection signal in a direction towards the tennis ball collection apparatus, and moving the ball picking robot backwardly;
receiving by the ball picking robot an ultrasonic reflection signal reflected from the tennis ball collection apparatus and performing distance measurement, and in response to a measured distance value between the ball picking robot and the tennis ball collection apparatus reaching a preset value of a ball unloading distance, stop moving the ball picking robot.

9. The ball unloading method of claim 8, wherein after driving by the drive motor the movable end of the electric push rod to cause the ball storage frame to move upwardly, the method further comprises:
opening a turning plate of the ball storage frame in response to a height of the turning plate is higher than a height of the baffle on the ball picking robot.

10. The ball unloading method of claim 9, wherein a length of the opened turning plate projected on a horizontal plane is equal to the preset value of the ball unloading distance.

* * * * *